Jan. 5, 1960 W. GRIFT ET AL 2,920,146
MAGNETIC RECORDING DEVICE
Filed Aug. 29, 1955
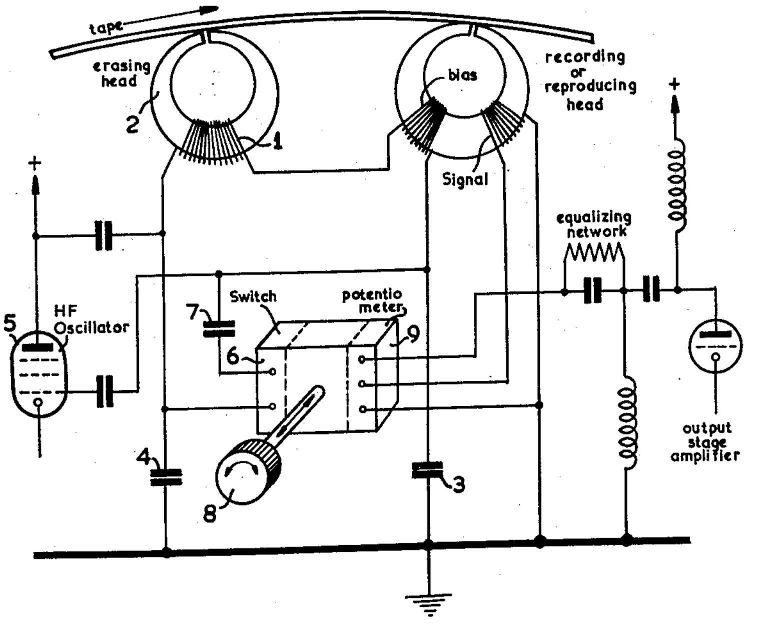
INVENTOR
WOUTER GRIFT
JEAN LOUIS ROULET
BY [signature]
AGENT United States Patent Office 2,920,146

Patented Jan. 5, 1960

2,920,146

MAGNETIC RECORDING DEVICE

Wouter Grift and Jean Louis Roulet, Eindhoven, Netherlands, assignors, by mesne assignments, to North American Philips Company, Inc., New York, N.Y., a corporation of Delaware Application August 29, 1955, Serial No. 530,978

Claims priority, application Netherlands September 25, 1954

1 Claim. (Cl. 179—100.2)

The present invention relates to magnetic recording. More particularly, the invention relates to a device for magnetic recording and, if desired, magnetic reproduction, comprising a high-frequency oscillator for erasing and premagnetizing, if desired in combination with a radio-receiver or a radio-phonograph.

In known devices, the frequency to which the high-frequency oscillator is adjusted has a constant value which is not adjustable.

It is also known to utilize predetermined different values of the oscillator frequency for erasing magnetic records on the one hand and for premagnetizing on the other. Both frequency values may be obtained with the use of a single oscillator; the oscillator frequency being used for premagnetizing and a higher harmonic thereof being used for erasing.

Applicants have found that, if a device of the above-mentioned kind is located in the vicinity of an operative receiver, troublesome interference phenomena occur in the transmission of the programs from AM-stations, due to induction in the reception of such stations, more particularly in the long-wave band, but also in the medium-wave range. These are interference tones which are located in the acoustic range and which occur due to interaction of the radio-frequency carrier and the high-frequency oscillations of the oscillator.

With the existing transmitter situation in the long-wave and medium-wave ranges it has been found impossible to choose and adjust the oscillator frequency in such manner that any desired station can be received free from the said disturbing interference phenomena.

In order to obviate this disadvantage, in the device according to the invention the frequency of the oscillator may be adjusted to different values during operation.

If in tuning-in the receiver on a determined station a disturbing interference of the carrier wave having the fundamental frequency of the oscillator or a harmonic thereof becomes manifest as troublesome, this may be remedied in a very simple and efficacious manner in the device according to the invention by adjusting to a different value of the oscillator frequency.

Although it is possible for the oscillator frequency to be controlled continuously, an additional capacitor may be switched on and off in a simple manner for obtaining two discrete frequency values, which in practice has been found sufficient in most cases.

Such a capacitor is advantageously switched into or out of circuit by means of a pull-push switch which is combined with the knob of the potentiometer controlling the modulation of the signal to be recorded.

In order that the invention may be readily carried into effect, it will now be described, by way of example, with reference to the accompanying drawing, wherein the single figure is a schematic diagram of a preferred embodiment of the device of the present invention.

The figure shows a portion of a high-frequency oscillator for erasing and premagnetizing in a device for magnetic recording and, if desired, reproduction. A coil 1, which also determines the frequency, serves as the winding for the erasing head, the magnetic circuit of which is indicated by 2. The coil 1 is connected on each side, by way of capacitors 3 and 4, to ground and is also connected by way of several coupling capacitors to an oscillator tube 5, viz. to the anode and the grid thereof. The oscillator frequency is 41 kilocycles per second due to particular proportioning of the component parts of the electric circuit. According to the invention, the oscillator frequency may be adjusted to another value by operating a switch 6. This switch 6 has been carried out as a pull-push switch which is combined with the knob 8 of the potentiometer 9 controlling the magnitude of the signal to be recorded. When a capacitor 7 is switched in by the pull-push switch 6, the electric circuit is so varied that the frequency adjusts itself at 37 kilocycles per second. Said values are chosen to be such, that, if interference occurs at one frequency, it does not appear with adjustment to the other frequency value. Furthermore, the advantage is obtained that the oscillator frequency need not be adjusted accurately, since there is always the possibility of switching-over for making a station free from interference.

What is claimed is:

A magnetic recording device for recording sound on a magnetic medium, comprising a magnetic circuit, means for varying the magnitude of the sound to be recorded on said medium, a high frequency oscillator coupled to said circuit for producing therein a bias field at a given high frequency value, a circuit for determining the frequency of oscillation of said oscillator, a capacitor adapted to be connected into said last-mentioned circuit thereby to vary said frequency of oscillation, and switching means combined with said magnitude varying means and adapted to operate conjointly therewith to connect said capacitor into said last-mentioned circuit.

References Cited in the file of this patent

UNITED STATES PATENTS

| | | |
|---|---|---|
| 2,704,790 | Gratian | Mar. 22, 1955 |
| 2,810,791 | West et al. | Oct. 22, 1957 |